July 10, 1928.
H. B. STONE
1,676,968
FILING POST FOR LOOSE LEAF LEDGERS AND LIKE BINDERS
Filed June 9, 1924
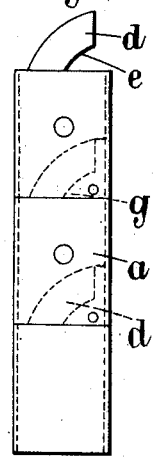
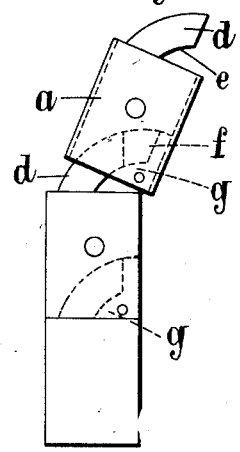
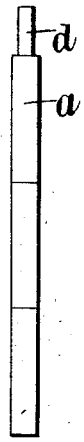
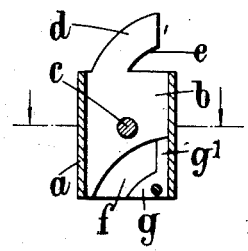
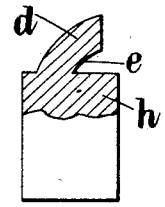
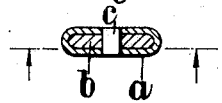
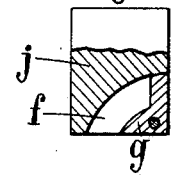
INVENTOR
Howard B. Stone
BY
James L. Norris
ATTORNEY Patented July 10, 1928.

1,676,968

UNITED STATES PATENT OFFICE.

HOWARD BRITTEN STONE, OF LONDON, ENGLAND.

FILING POST FOR LOOSE-LEAF LEDGERS AND LIKE BINDERS.

Application filed June 9, 1924, Serial No. 718,908, and in Great Britain June 19, 1923.

This invention relates to improvements in filing posts for loose leaf ledgers or like binders, and more particularly to such posts the exterior shape of which approximates to a rectangle, constructed for example from flattened tubular material.

According to this invention posts of substantially rectangular cross-section with rounded edges are built up of separate and separable parts or sections connected together by suitable tenon like joints which admit of attachment and detachment without screwing.

In the accompanying drawings:

Figure 1 is a side view of three parts or sections of a filing post, joined together in accordance with this invention.

Figure 2 is a similar view showing one part or section partly detached from the adjacent part or section, and Figure 3 is an edge view thereof.

Figures 4 and 5 show sectional views of an intermediate part or section of a filing post.

Figures 6 and 7 are views, partly in section, of the end parts or sections of a filing post.

As shown in Figures 4 and 5, each part or section is formed of flattened tubular material $a$ and has a plate $b$ held therein by a rivet $c$, this plate projecting from one end of the tubular part $a$ so as to form a tenon $d$. This tenon is of quadrant shape with a notch $e$ in that part of the longitudinally extending straight edge thereof which projects beyond the end edge of the tubular part $a$. The plate $b$ is cut away at its opposite end to form a mortise $f$ to receive a tenon similar to the tenon $d$, of another post, and the tubular part $a$ is provided with an inwardly projecting lug or lip $g$ intended to enter the notch $e$ of the tenon $d$ of the other post which is inserted in this end of the tubular part, thus to holding together two similar post parts or sections.

The lug $g$ is formed with an extension forming a flat member $g'$ extending longitudinally of the tubular part $a$ between the quadrantal walls of the mortise $f$.

The lug $g$, as shown, is formed by a separate part for convenience of manufacture, and is held firmly in place by a single rivet, with one of its edges resting flatly against the interior wall of the part $a$, or the lug $g$ may be made integral with the plate $b$.

The centers of curvature of the quadrantal portion of the tenon $d$, of the mortise $f$ and of the curved portion of the lug or lip $g$ of each part or section lie immediately outside of one of the vertical sides of such part or section.

Terminal parts for a composite post, such as the part $h$ in Figure 6 which has a tenon $d$ only, or the part $j$ in Figure 7 which has a mortise $f$ and lug $g$ but no tenon, are provided.

This method of connection makes it possible to secure together or to separate parts of substantially rectangular cross section as desired, in order to vary the length of the post built up of such parts. Figure 2 shows the upper part or section partly engaged on the tenon of the next section so that it can be brought into alignment with the other sections by turning it in one direction or detached by turning it in the opposite direction. The curved edge of the tenon allows the notch $e$ to be brought into engagement with the lug or lip $g$ within the mortise $f$ of another post part or section so as to hold these post parts attached together against a pull exerted in the direction of the length of the post, and the tenon and mortise provide a joint having a very substantial lateral stiffness.

Figure 4 shows a post section built up of three parts $a$, $b$, and $g$ riveted together; Figure 6 shows an end post section cut from a single piece of material with a tenon $d$ formed integrally therewith; and Figure 7 shows an end section comprising one part having a mortise $f$ cut therein and a lug or lip $g$ secured in this mortise by means of a rivet. Each of these post parts may, however, be built up of parts, or formed in a single piece, as may be most convenient, taking into consideration the precise shape to be given to these parts. For example, the post section shown in Figure 4 may be made in one piece by making one end thereof as shown in Figure 6 and the other end as shown in Figure 7.

I claim:

1. A filing post section comprising a body portion having a mortise in one end thereof formed with a quadrantal wall of less extent than a quarter of a circle, a lug extending into the said mortise and having a quadrantal wall of less extent than a quarter of a circle set opposite to the quadrantal wall of the mortise, and a tenon having opposite quadrantal edges each of less extent than a quarter of a circle extending from the other end of said body portion.

2. A filing post embodying sections each comprising a body portion having in one of its ends a recess provided with an arcuate wall to form a mortise, a lug fixedly secured in said mortise and having an arcuate wall opposite the arcuate wall of said recess, and a tenon carried by the opposite end of said body portion and provided with arcuate edges corresponding, respectively, in curvature and length to the curvature and length of the arcuate walls of the mortise and the lug.

3. A filing post section comprising a flattened tubular portion, a plate riveted within the tubular portion, an extension of the said plate at one end thereof projecting outside the tubular portion to form a tenon of annular segmental shape of less extent than a quarter of a circle, a curved wall formed on the other end of the plate to provide a mortise, and a lug fixedly secured within this mortise and having a curved wall arranged opposite to the curved wall of the plate.

4. A filing post section comprising a body portion, having a mortise in one end thereof formed with a quadrantal wall, and a lug fixedly secured in the said mortise and having a quadrantal wall of equal angular extent arranged opposite to the quadrantal wall of the mortise and spaced apart therefrom.

5. A filing post section comprising a body portion and an annular segmental tenon of less extent than a quarter of a circle extending from one end thereof and within the width thereof.

6. A filing post section comprising a body portion having at one end a curved wall recessed therein to form a mortise, a lug having a curved wall opposite to the said recessed curved wall, and an annular segmental tenon of less extent than a quarter of a circle carried by the other end of said body, said tenon having curved edges equal in length and curvature to the said curved walls, respectively.

7. A filing post section comprising a body portion having at one end a curved wall recessed therein to form a mortise, a lug having a curved wall opposite to said recessed curved wall and spaced apart therefrom, and a tenon carried by the other end of said body portion and corresponding in shape to the space between said curved walls.

8. A filing post section comprising a flattened tubular portion, a plate riveted within said tubular portion, said plate having an extension projecting beyond one end of said tubular portion to form a quadrantal tenon, said tenon having a longitudinally disposed flat face, the other end of said plate having a curved wall forming a mortise with the interior of said tubular portion, a lug secured within said mortise and having a curved wall opposite to the curved wall of said plate, and a flat member extending longitudinally of said tubular portion between the ends of said curved walls.

9. A filing post section comprising a body portion having a mortise with a quadrantal wall, a lug within the mortise having a quadrantal wall opposite to the quadrantal wall of the mortise, a flat member extending longitudinally of said body portion between the ends of said quadrantal walls, and a quadrantal tenon extending from the other end of said body portion and having walls similar to the quadrantal walls of the mortise and a longitudinally disposed terminal flat face.

HOWARD BRITTEN STONE.